H. WAKEMAN.
Armor for Flexible Tubing.

No. 200,493.  Patented Feb. 19, 1878.

Witnesses
Chas. H. Smith
Harold Serrell

Inventor
Harwood Wakeman
per Lemuel W. Serrell
atty.

UNITED STATES PATENT OFFICE.

HARWOOD WAKEMAN, OF NEW YORK, N. Y.

IMPROVEMENT IN ARMOR FOR FLEXIBLE TUBING.

Specification forming part of Letters Patent No. 200,493, dated February 19, 1878; application filed November 28, 1877.

*To all whom it may concern:*

Be it known that I, HARWOOD WAKEMAN, of the city and State of New York, have invented an Improvement in Armor for Flexible Tubing, of which the following is a specification:

In Letters Patent heretofore granted to me, and respectively numbered 188,446 and 188,554, an armor for flexible tubing is described, consisting in interlaced springs and interlaced netting or open-work.

My present improvement relates to an armor for flexible tubing, consisting of interlaced links, forming a cylindrical chain, inclosing and protecting the flexible tubing, and yielding freely to the movements of such tubing when employed between railway-cars for connecting the air-brakes, or when employed for conveying compressed air or other fluid, for operating mining machinery or for other purposes.

Figure 2:
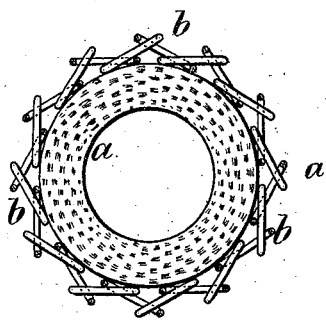
Figure 1:
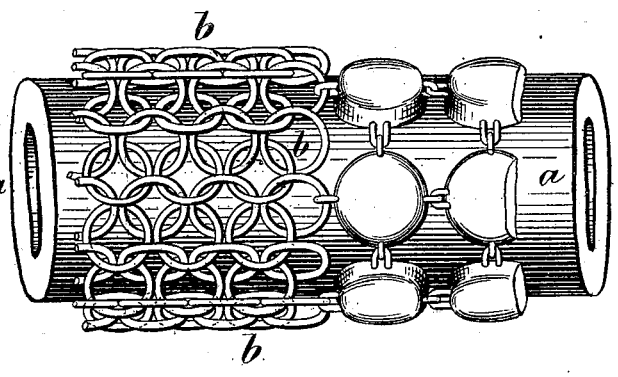

In the drawings, Figure 1 is a side view, and Fig. 2 a cross-section, of the tube with the armor.

The flexible tube $a$ is of india-rubber or other material, and around it is the cylindrical-chain armor, composed of links $b$, of any suitable shape. I have shown these links $b$ as circular, and they are linked together both longitudinally and transversely around the flexible tube, and in this manner become a hollow cylindrical-chain armor, within which is the said flexible tube.

Some of the links I have represented as open rings, and others as closed plates or disks, with the interlinking projections at the edges.

I claim as my invention—

The armor for flexible tubing, composed of a cylindrical hollow chain, the links of which are connected, substantially as set forth.

Signed by me this 22d day of November, A. D. 1877.

HARWOOD WAKEMAN.

Witnesses:
GEO. T. PINCKNEY,
WILLIAM G. MOTT.